(12) United States Patent
Heishi et al.

(10) Patent No.: US 8,896,891 B2
(45) Date of Patent: Nov. 25, 2014

(54) DOCUMENT CONVEYING DEVICE, IMAGE READING DEVICE, AND IMAGE FORMING APPARATUS

(71) Applicants: Fumiyuki Heishi, Miyagi (JP); Hiroshi Kubo, Kanagawa (JP); Takashi Fujii, Kanagawa (JP); Shinya Kitaoka, Kanagawa (JP); Takeshi Akai, Kanagawa (JP); Takehisa Shimazu, Tokyo (JP); Takuma Ariga, Kanagawa (JP); Michitaka Suzuki, Kanagawa (JP); Yoshito Suzuki, Kanagawa (JP); Jun Yamada, Kanagawa (JP); Satoshi Saito, Kanagawa (JP); Kenichiro Morita, Tokyo (JP); Ikuhisa Okamoto, Kanagawa (JP); Kenji Hayasaka, Miyagi (JP); Hiroaki Utagawa, Miyagi (JP)

(72) Inventors: Fumiyuki Heishi, Miyagi (JP); Hiroshi Kubo, Kanagawa (JP); Takashi Fujii, Kanagawa (JP); Shinya Kitaoka, Kanagawa (JP); Takeshi Akai, Kanagawa (JP); Takehisa Shimazu, Tokyo (JP); Takuma Ariga, Kanagawa (JP); Michitaka Suzuki, Kanagawa (JP); Yoshito Suzuki, Kanagawa (JP); Jun Yamada, Kanagawa (JP); Satoshi Saito, Kanagawa (JP); Kenichiro Morita, Tokyo (JP); Ikuhisa Okamoto, Kanagawa (JP); Kenji Hayasaka, Miyagi (JP); Hiroaki Utagawa, Miyagi (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/803,114

(22) Filed: Mar. 14, 2013

(65) Prior Publication Data

US 2013/0242359 A1   Sep. 19, 2013

(30) Foreign Application Priority Data

Mar. 15, 2012 (JP) .................................. 2012-058840

(51) Int. Cl.
*H04N 1/04* (2006.01)
(Continued)

(52) U.S. Cl.
CPC ......... *H04N 1/0062* (2013.01); *H04N 1/00655* (2013.01); *H04N 1/00628* (2013.01);
(Continued)

(58) Field of Classification Search
CPC .......... B41J 11/007; B41J 29/02; B41J 29/38; B41J 2/1752; G03G 15/6558; G03G 2215/00409; G03G 2215/00561; G03G 15/2017; G03G 15/6552; G03G 21/0029; B21D 51/46; B65H 1/20; B65H 2301/4213; H04N 1/0057; H04N 1/00588; H04N 1/00591; H04N 1/00602; H04N 1/00708; H04N 1/00745; H04N 1/193; H04N 1/00604; H04N 1/00607; H04N 1/006
USPC ........... 358/498; 399/351, 299, 329; 271/160, 271/220, 34
See application file for complete search history.

(56) References Cited

U.S. PATENT DOCUMENTS 5,453,852 A * 9/1995 Morikawa et al. ............. 358/498
5,493,422 A * 2/1996 Morikawa et al. ............. 358/474

(Continued)

FOREIGN PATENT DOCUMENTS

| JP | 2002-179276 | 6/2002 |
| JP | 3560741 | 6/2004 |
| JP | 3694012 | 7/2005 |

*Primary Examiner* — Negussie Worku
(74) *Attorney, Agent, or Firm* — Harness, Dickey & Pierce, P.L.C.

(57) ABSTRACT

A document conveying device includes a document table on which a stack of document sheets is placed; a rotating shaft member detachably provided on a main body of the document conveying device; a feeding member configured to contact and feed a topmost sheet of the stack of document sheets, the feeding member being attached to the rotating shaft member via a driving force transmitting member; a separating unit configured to separate the topmost sheet from one or more sheets that are fed together with the topmost sheet, rotating members rotatably attached to the rotating shaft member; a holding member configured to hold the feeding member and the driving force transmitting member; and a rotating member position restricting unit configured to restrict a position of the rotating members other than the holding member to a given predetermined position with reference to a position of the holding member.

11 Claims, 11 Drawing Sheets

(51) Int. Cl.
*H04N 1/00* (2006.01)
*B65H 3/52* (2006.01)
*B65H 5/02* (2006.01)
*B65H 3/06* (2006.01)

(52) U.S. Cl.
CPC ............. *B65H 3/5261* (2013.01); *B65H 5/025* (2013.01); *H04N 2201/0091* (2013.01); *B65H 3/0684* (2013.01)
USPC ............ 358/474; 358/498; 271/134; 399/367

(56) References Cited

U.S. PATENT DOCUMENTS

| | | | | |
|---|---|---|---|---|
| 5,504,587 | A | * | 4/1996 | Morikawa et al. ............ 358/400 |
| 5,537,219 | A | * | 7/1996 | Morikawa et al. ............ 358/406 |
| 5,579,129 | A | * | 11/1996 | Iwata et al. .................... 358/474 |
| 5,700,213 | A | | 12/1997 | Simpson et al. |
| 5,956,161 | A | * | 9/1999 | Takashimizu et al. ........ 358/496 |
| 5,969,831 | A | * | 10/1999 | Ichinose ........................ 358/498 |
| 6,029,970 | A | * | 2/2000 | Hwang ........................ 271/9.08 |
| 7,077,517 | B2 | * | 7/2006 | Awai et al. ..................... 347/104 |
| 8,540,238 | B2 | * | 9/2013 | Osakabe et al. ............... 271/212 |
| 8,743,431 | B2 | * | 6/2014 | Hayasaka et al. .............. 358/498 |

* cited by examiner

DOCUMENT CONVEYING DEVICE, IMAGE READING DEVICE, AND IMAGE FORMING APPARATUS

CROSS-REFERENCE TO RELATED APPLICATION

The present application claims priority to and incorporates by reference the entire contents of Japanese Patent Application No. 2012-058840 filed in Japan on Mar. 15, 2012.

BACKGROUND OF THE INVENTION

1. Field of the Invention

The present invention relates to a document conveying device, an image reading device, and an image forming apparatus.

2. Description of the Related Art

Previously known are image forming apparatuses including an image reading device provided with a document conveying device that feeds documents one by one from a document table on which the documents, i.e., sheets, are stacked, to a read position at which a document image is read by an image reading unit.

A document conveying device disclosed in Japanese Patent No. 3694012 includes a driving shaft that is a rotating shaft member to be coupled to a driving source provided on a device body, and a rotary driving force from the driving source is transmitted to the driving shaft. The driving shaft is attached with a feeding roller holder that is one of rotating members rotatable with respect to the driving shaft, and on the inner side of the feeding roller holder, a feeding roller and a separating belt are arranged. The feeding roller is coupled to the driving shaft via driving force transmitting members such as gears and a belt, and is held to the feeding roller holder together with the driving force transmitting members. The separating belt is stretched between a driving roller attached to the driving shaft and a driven roller that follows to rotate with the surface movement of the separating belt. On both sides of the driving shaft in the axis direction intervening the feeding roller holder, a pair of guide plates that is one of the rotating members rotatable with respect to the driving shaft is attached. The guide plates constitute a part of a document feed path on which a plurality of conveying rollers are provided, and serve to guide a document conveyed by the conveying rollers towards a read position set on the device body.

The feeding roller contacts an upper surface of the topmost sheet of a stack of sheets placed on a document table and drives to rotate so as to exert a conveying force to the single sheet of document. The separating belt separates the topmost sheet, which is exerted with the conveying force and is fed by the feeding roller, from other sheets that are overlapping the topmost sheet and are conveyed together with the topmost sheet. The topmost sheet thus separated from the other sheets is conveyed towards the read position by the conveying rollers while being guided by the guide plates.

Furthermore, replacement work and maintenance work are performed as dirt accumulates and wear occurs on the feeding roller and the separating belt in use over time. In the document conveying device described in Japanese Patent No. 3694012, the driving shaft is made detachable from the device body. Moreover, the feeding roller holder combined with the feeding roller and others is made detachable from the driving shaft. Accordingly, removing the driving shaft from the device body and further removing the feeding roller holder from the driving shaft allow workability in replacement work and maintenance work of the feeding roller and the separating belt to be substantially improved.

When attaching the driving shaft to the device body after finishing the replacement work or the maintenance work, there may be a situation in which the positions of the guide plates are inverted with reference to the position of the feeding roller holder. In this case, the positions of the guide plates are in a different position from a normal position in which the conveyance of the sheet can be guided. When the driving shaft is attached to the device body as it stands, the guide plates may be damaged or poor conveyance may result.

The rotating members rotatably attached to the driving shaft are not limited to the guide plates. For example, there may be a situation in which a lifting member rotatably attached to the driving shaft and to raise and lower the feeding roller holder in connection with the rotation of the lifting member is used as a lifting unit to raise and lower the feeding roller holder so as to make the feeding roller contact with and separate from a stack of sheets stacked on the document table. In this case, when the driving shaft is attached to the device body while the position of the lifting member is different from a normal position in which the feeding roller holder can be raised and lowered, the lifting member may be damaged or a failure in document feeding by the feeding roller may result as the feeding roller holder cannot be raised and lowered.

Therefore, when attaching the driving shaft to the device body, it is necessary to prevent the occurrence of wrong assembly in which the rotating members such as the guide plates and the lifting member rotatably attached to the driving shaft are assembled to the device body in a position different from a given predetermined position.

Therefore, there is a need to provide a document conveying device that can prevent the occurrence of wrong assembly in which rotating members rotatably attached to a rotating shaft member is wrongly assembled to a device body, and an image reading device and an image forming apparatus provided with the document conveying device.

SUMMARY OF THE INVENTION

It is an object of the present invention to at least partially solve the problems in the conventional technology.

According to an embodiment, there is provided a document conveying device that includes a document table on which a stack of sheets composed of a plurality of documents is placed; a rotating shaft member detachably provided on a main body of the document conveying device and rotated by rotary driving force transmitted from a driving source; a feeding member configured to contact and feed a topmost sheet of the stack of sheets placed on the document table, the feeding member being attached to the rotating shaft member via a driving force transmitting member; a separating unit configured to separate the topmost sheet from one or more sheets that are fed together with the topmost sheet, the separating unit being attached to the rotating shaft member; a plurality of rotating members rotatably attached to the rotating shaft member; a holding member configured to hold the feeding member and the driving force transmitting member, the holding member being one of the rotating members and detachably attached to the rotating shaft member; and a rotating member position restricting unit configured to restrict a position of the rotating members other than the holding member to a given predetermined position with reference to a position of the holding member.

According to another embodiment, there is provided an image reading device that includes a document reading unit configured to read an image of a document while exposing the document; and the document conveying device according to the above embodiment, the document conveying device being configured to convey the document placed on the document table towards a conveying destination through a read position of the document reading unit, the document reading unit reading the image of the document at the read position.

According to still another embodiment, there is provided an image forming apparatus that includes an image forming unit configured to form an image on a recording material; and the image reading device according to the above embodiment. The image read by the image reading device is formed on the recording material by the image forming unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An exemplary embodiment of the present invention applicable to a copying machine in electrophotography (hereinafter, simply referred to as a copier 500) will be described below.

A basic configuration of the copier 500 according to the present embodiment will be described first.

Figure 2:
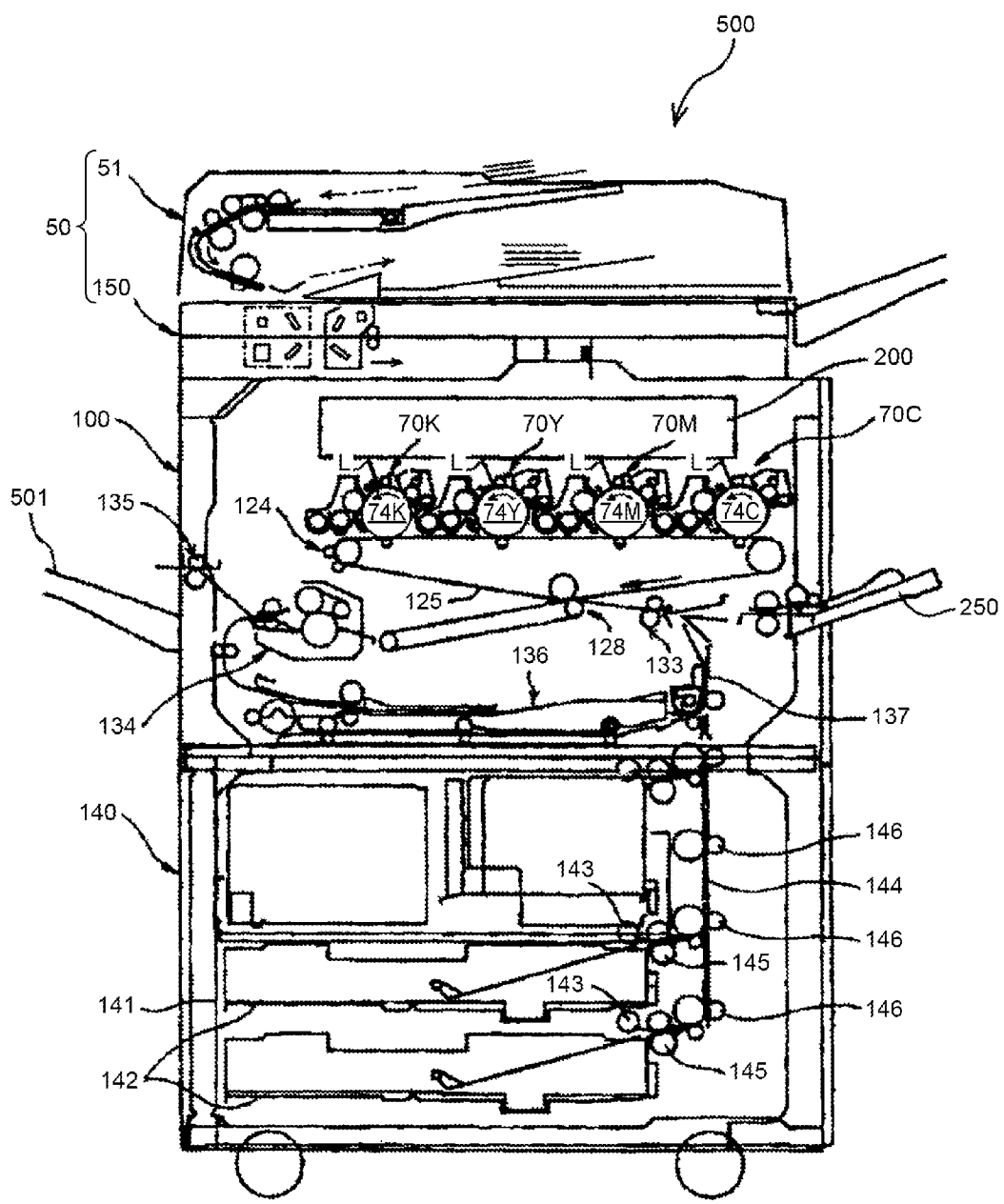
FIG. 2 is a schematic diagram illustrating a copying machine.

FIG. 2 is a schematic diagram illustrating the configuration of the copier 500. The copier 500 includes an image forming unit 100 as an image forming unit, a paper feeding device 140, and an image reading unit 50 as an image reading device.

The image reading unit 50 includes a scanner 150 secured above the image forming unit 100, and an automatic document feeder (hereinafter, referred to as an ADF) 51 as a document conveying device supported by the scanner 150.

The paper feeding device 140 includes two pieces of paper cassettes 142 in a multistage arrangement inside a paper bank 141, delivery rollers 143 that deliver transfer paper P as a recording medium from the paper cassettes 142, separating rollers 145 that separate the transfer paper P delivered and supply it to a paper feeding path 144, and others. Provided on the paper feeding path 144 are a plurality of conveying rollers 146 that convey the transfer paper P to a transfer paper feeding path 137 of the image forming unit 100 on body side. The delivery rollers 143 deliver the transfer paper P in the paper cassettes 142, the separating rollers 145 separate and supply the transfer paper P to the paper feeding path 144, and the conveying rollers 146 convey the transfer paper P through the paper feeding path 144 to send the transfer paper P into the transfer paper feeding path 137 on body side.

The image forming unit 100 includes an optical writing device 200, four units of processing units 70K, 70Y, 70M, and 70C that form respective toner images in black (K), yellow (Y), magenta (M), and cyan (C), a transfer unit 124, a paper conveying unit 128, a pair of registration rollers 133, a fixing device 134, a transfer paper reversing device 136, the transfer paper feeding path 137 on body side, and others. A light source arranged in the optical writing device 200 such as a laser diode and an LED not depicted is driven to irradiate drum-shaped photosensitive elements 74K, 74Y, 74M, and 74C provided on the processing units 70K, 70Y, 70M, and 70C, respectively, with writing light L. By the irradiation, latent images are formed on the respective surfaces of the photosensitive elements 74K, 74Y, 74M, and 74C, and the latent images are developed as toner images through a given developing process.

Figure 3:
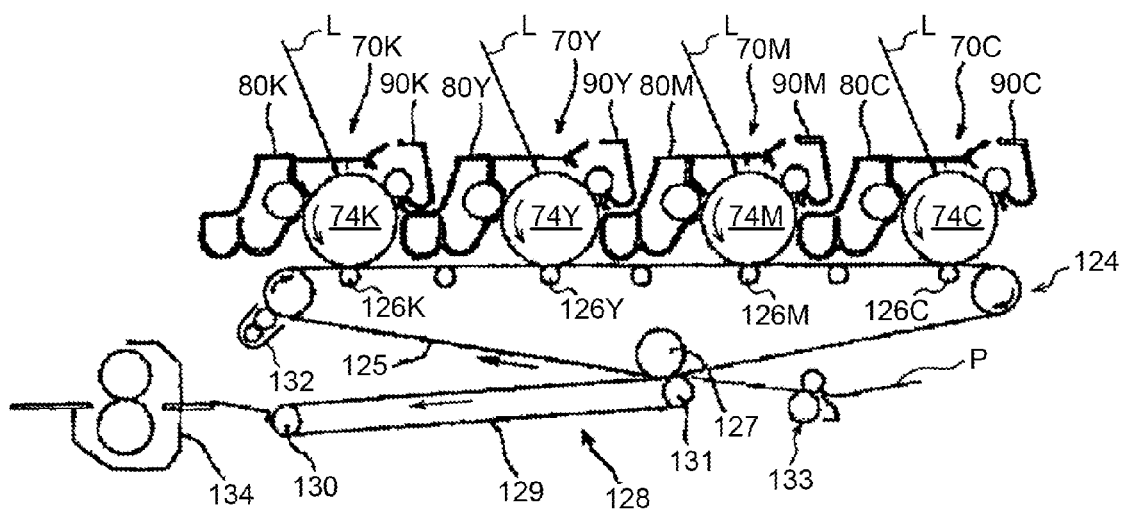
FIG. 3 is an enlarged view illustrating a configuration of a part of an internal structure of an image forming unit.
Figure 4:
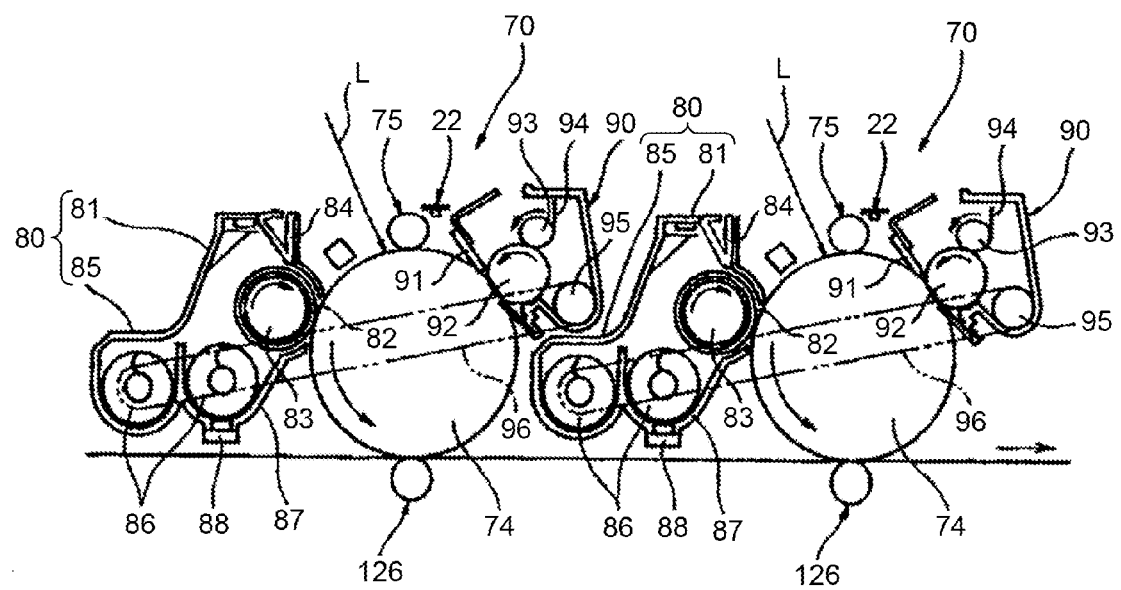
FIG. 4 is an enlarged view illustrating a part of a tandem unit.

FIG. 3 is an enlarged view illustrating the configuration of a part of an internal structure of the image forming unit 100. FIG. 4 is an enlarged view illustrating a part of a tandem unit including the four processing units 70K, 70Y, 70M, and 70C. Because the processing units 70K, 70Y, 70M, and 70C are configured nearly the same except for the colors of toner used being different, the suffixes of K, Y, M, and C to be affixed to the respective symbols are omitted in FIG. 4.

The processing unit 70 includes the photosensitive element 74, and a charging device 75, a developing device 80, a drum cleaning device 90, a neutralization lamp 22, and others arranged to surround the photosensitive element 74. The processing unit 70 supports the foregoing on a common supporting body as a single unit and is detachable from the image forming unit 100. The copier 500 is arranged in a tandem configuration with the processing units 70K, 70Y, 70M, and 70C lined along an endless moving direction of a later-described intermediate transfer belt 125 facing the intermediate transfer belt 125.

As for the photosensitive element 74, an element tube of aluminum and such in a drum shape is used with a photosensitive layer formed thereon by applying an organic sensitive material having photosensitivity. A photosensitive element in an endless-belt shape may be used.

The developing device 80 uses two-component developer containing magnetic carrier and non-magnetic toner not depicted (hereinafter, simply referred to as developer) to develop a latent image formed on the surface of the photosensitive element 74. In the developing device 80, provided are a stirring unit 85 that conveys and supplies the developer housed in a developing case 87 to a developing sleeve 82 while stirring the developer, and a developing unit 81 to transfer the toner in the developer carried on the developing sleeve 82 to the photosensitive element 74.

The stirring unit 85 is provided at a position lower than the developing unit 81, and includes two pieces of conveying screws 86 arranged in parallel with each other, a partition plate provided between the two conveying screws 86, a toner concentration sensor 88 provided at the bottom surface of the developing case 87, and others.

The developing unit 81 includes the developing sleeve 82 that is rotatably provided at an opening of the developing case 87 facing the photosensitive element 74 and carries the developer on the surface thereof, a magnet roller 83 provided inside the developing sleeve 82 to be not rotatable, a doctor blade 84 provided with the tip thereof placed close to the surface of the developing sleeve 82 to regulate the amount of developer carried on the developing sleeve 82, and others. The developing sleeve 82 is nonmagnetic and is in a tubular shape to be rotatable. The magnet roller 83 has a plurality of magnetic poles lined in series in the rotational direction of the developing sleeve 82 from a position facing the doctor blade 84. Each of the magnetic poles makes magnetic force act on the developer on the developing sleeve 82 at a given position in the rotational direction. This causes the developer sent from the stirring unit 85 to be drawn to and carried on the surface of the developing sleeve 82, and forms a magnetic brush on the surface of the developing sleeve 82 along the lines of magnetic force.

The magnetic brush is regulated to be a layer of an appropriate thickness when passing the position facing the doctor blade 84 along with the rotation of the developing sleeve 82, and is conveyed to a developing area facing the photosensitive element 74. By a potential difference between a developing bias applied to the developing sleeve 82 and the latent image on the photosensitive element 74, the toner is transferred from the developing sleeve 82 side to the latent image on the photosensitive element 74 to develop the latent image on the photosensitive element 74. The developer on the developing sleeve 82 that has passed the developing area not contributing to the developing in the developing area is returned inside the developing unit 81 again along with the rotation of the developing sleeve 82. The developer is separated from the surface of the developing sleeve 82 by the influence of a repulsive magnetic field formed between the magnetic poles of the magnet roller 83, and is subsequently returned inside the stirring unit 85. In the stirring unit 85, an appropriate amount of toner is replenished based on the detection result of the toner concentration sensor 88. As for the developing device 80, a developing device that uses not two-component developer but one-component developer containing no magnetic carrier may be adopted.

As for the drum cleaning device 90, a cleaning device that presses a cleaning blade 91 made of an elastic body against the photosensitive element 74 is used. However, other types of drum cleaning device may be used. In the present embodiment, for the purpose of improving cleaning performance, a cleaning device that includes a contact-conductive fur brush 92 that rotates in the counter-clockwise direction in FIG. 4 and makes the outer circumferential surface thereof contact the photosensitive element 74 is further adopted. The fur brush 92 also serves to scrape off lubricant from a solid lubricant not depicted while reducing the lubricant to fine powder and to apply the lubricant on the surface of the photosensitive element 74.

Furthermore, a metallic electric field roller 93 that applies bias to the fur brush 92 is provided to rotate in the counter-clockwise direction in FIG. 4, and the tip of a scraper 94 is pressed against the electric field roller 93. The toner adhered on the fur brush 92 is transferred to the electric field roller 93 to which the bias is applied while contacting the fur brush 92 and rotating in a counter direction to that of the fur brush 92. The toner transferred to the electric field roller 93 is scraped off from the electric field roller 93 by the scraper 94, and then falls off on a recovery screw 95. The recovery screw 95 conveys the collected toner towards an end portion of the drum cleaning device 90 in the direction orthogonal to the plane of FIG. 4 and transfers the toner to an external recycle toner conveying device 96. The recycle toner conveying device 96 sends the toner transferred from the recovery screw 95 to the developing device 80 to recycle the toner.

The neutralization lamp 22 neutralizes the surface of the photosensitive element 74 by light irradiation. The neutralized surface of the photosensitive element 74 is uniformly charged by the charging device 75, and then an optical writing process is performed by the optical writing device 200. In the copier 500, a charging device that rotates a charging roller to which a charging bias is applied while contacting the photosensitive element 74 is used as the charging device 75. However, a scorotron charger or the like that performs a charging process on the photosensitive element 74 in a non-contact manner may be used.

Referring back to FIG. 3, on the photosensitive elements 74K, 74Y, 74M, and 74C of the processing units 70K, 70Y, 70M, and 70C, toner images in colors of K, Y, M, and C, respectively, are formed by the above-described process.

Below the processing units 70K, 70Y, 70M, and 70C, the transfer unit 124 is arranged. The transfer unit 124 endlessly moves the intermediate transfer belt 125, which is stretched by a plurality of rollers, in the clockwise direction in FIG. 3 contacting the photosensitive elements 74K, 74Y, 74M, and 74C. Accordingly, primary transfer nips for K, Y, M, and C at which the respective photosensitive elements 74K, 74Y, 74M, and 74C and the intermediate transfer belt 125 make contact are formed.

Near the primary transfer nips for K, Y, M, and C, the intermediate transfer belt 125 is pressed towards the photosensitive elements 74K, 74Y, 74M, and 74C by respective primary transfer rollers 126K, 126Y, 126M, and 126C arranged inside the belt loop. The primary transfer rollers 126K, 126Y, 126M, and 126C are applied with a primary transfer bias by respective power supplies not depicted. Accordingly, primary transfer electric fields that make the toner images on the respective photosensitive elements 74K, 74Y, 74M, and 74C electrostatically move towards the intermediate transfer belt 125 are formed at the primary transfer nips for K, Y, M, and C. On the surface of the intermediate transfer belt 125 that sequentially passes over the primary transfer nips for K, Y, M, and C along with the movement thereof in the clockwise direction in FIG. 3, the toner images are primary transferred one on top of the other in series at each primary transfer nip. By the primary transfer in a superposing manner, a four-color superposed toner image (hereinafter, referred to as a four-color toner image) is formed on the surface of the intermediate transfer belt 125.

Below the transfer unit 124, provided is the paper conveying unit 128 that moves an endless paper conveying belt 129 stretched between a driving roller 130 and a secondary transfer roller 131. The intermediate transfer belt 125 and the paper conveying belt 129 are clamped between the secondary transfer roller 131 and a secondary transfer facing roller 127 of the transfer unit 124. This forms a secondary transfer nip at which the surface of the intermediate transfer belt 125 and the surface of the paper conveying belt 129 make contact. The secondary transfer roller 131 is applied with a secondary transfer bias by a power supply not depicted. On the other hand, the secondary transfer facing roller 127 of the transfer unit 124 is grounded. Accordingly, a secondary transfer electric field is formed at the secondary transfer nip.

On the right-hand side of the secondary transfer nip in FIG. 3, the pair of registration rollers 133 is arranged. Near the entrance of a registration nip of the pair of registration rollers 133, a registration roller sensor not depicted is arranged. The conveyance of the transfer paper P conveyed towards the pair of registration rollers 133 from the paper feeding device 140 is stopped temporarily, at a given time after the leading end of the transfer paper P is detected by the not depicted registration roller sensor, to make the leading end abut the registration nip of the pair of registration rollers 133. Consequently, the position of the transfer paper P is corrected and is prepared to synchronize with image forming.

When the leading end of the transfer paper P abuts the registration nip, the pair of registration rollers 133 resumes rotary drive of the rollers at the timing that allows the transfer paper P to be synchronized with the four-color toner image on the intermediate transfer belt 125 and sends out the transfer paper P to the secondary transfer nip. Within the secondary transfer nip, the four-color toner image on the intermediate transfer belt 125 is secondary transferred collectively to the transfer paper P by the effect of the secondary transfer electric field and a nip pressure, and combined with white color of the transfer paper P, a full-color image is formed. The transfer paper P that passed the secondary transfer nip is separated from the intermediate transfer belt 125, and while being held on the surface of the paper conveying belt 129, is conveyed towards the fixing device 134 along with the movement of the paper conveying belt 129.

On the surface of the intermediate transfer belt 125 that passed the secondary transfer nip, transfer residual toner that is not transferred to the transfer paper P at the secondary transfer nip is adhered. The transfer residual toner is scraped off and removed by a belt cleaning device 132 in which a cleaning member makes contact with the surface of the intermediate transfer belt 125.

The transfer paper P conveyed to the fixing device 134 is fixed with the full-color image by pressure and heat in the fixing device 134, and after being sent from the fixing device 134 to a pair of ejecting rollers 135, is discharged to a discharge tray 501 outside of the apparatus.

Figure 5:
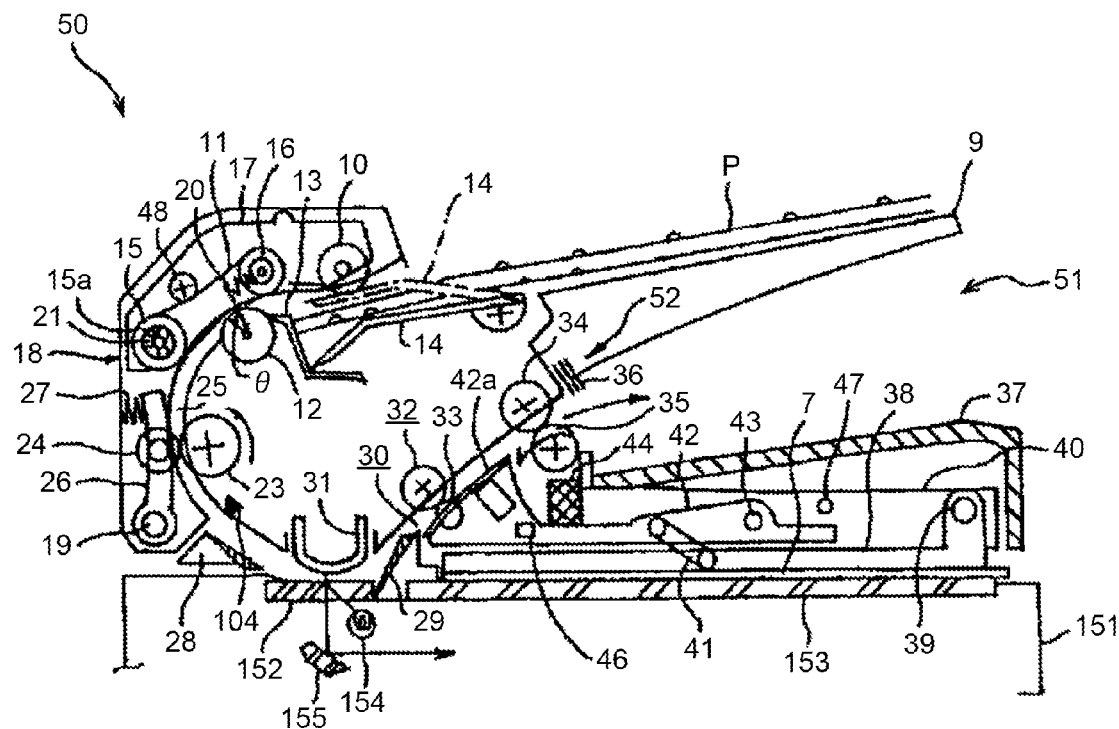
FIG. 5 is a schematic diagram illustrating a configuration of an image reading unit.

FIG. 5 is a schematic diagram illustrating the configuration of the image reading unit 50.

In FIG. 5, on the upper surface of the scanner 150, a slit glass 152 and an exposure glass 153 are provided. Below the slit glass 152 and the exposure glass 153, an exposure lamp 154, a mirror 155, and others are provided. The exposure lamp 154 and the mirror 155 move in the left-right direction in FIG. 5 below the exposure glass 153 when a document placed on the exposure glass 153 is read. When reading a document above the slit glass 152, the exposure lamp 154 and the mirror 155 stop below the slit glass 152. After the document side is read by the exposure lamp 154, the reflected light is made to form an image on an image forming element such as a CCD via the mirror 155 and a lens not depicted as is well-known.

Above the scanner 150, the ADF 51 is mounted. On the undersurface of the ADF 51, provided is a reflector 7 that presses the document placed on the exposure glass 153 towards the exposure glass 153 and serves as a reference white when reading the document. The ADF 51, as illustrated in FIG. 2, is coupled with the scanner 150 via a hinge 8, and is opened and closed with respect to the scanner 150.

Above the ADF 51, a document table 9 is provided, and on the document table 9, a stack of sheets P composed of a plurality of documents is placed. The sheets P placed on the document table 9 are fed by a feeding roller 10 that can contact with and move away from the topmost of the sheets P, and is then separated by a separating belt 11 and a separation restricting roller (opposing member) 12. The separating belt 11 contacts and presses the separation restricting roller 12 at an arbitrary angle θ.

On the downstream of the feeding roller 10 in a document conveying direction, a stopper member 13 is provided. The stack of sheets P placed on the document table 9 is pressed to stop by the stopper member 13 and is restricted to enter towards the separating belt 11 side.

Below the feeding roller 10, a pressing plate 14 is provided. The pressing plate 14 is made to contact and separate with respect to the feeding roller 10 by a solenoid not depicted. More specifically, when a copy start switch is pressed, the pressing plate 14 moves by the solenoid from a position separating from the feeding roller 10 indicated by solid lines to a position contacting the feeding roller 10 indicated by phantom lines, and presses the stack of sheets to the feeding roller 10 so that the topmost sheet is fed by the feeding roller 10.

The separating belt 11 is hanged between a driving roller 15 and a driven roller 16, and the driving roller 15 is coupled to a feeding roller holder 17 that is a holding member via a driving shaft 15a. The feeding roller holder 17 is rotatable centering around the driving shaft 15a, and the feeding roller holder 17 is attached with the feeding roller 10. Therefore, rotating the feeding roller holder 17 with the driving shaft 15a as a fulcrum separates the feeding roller 10 from the stack of sheets P. Under this condition, rotating the driven roller 16 centering around the driving shaft 15a separates the separating belt 11 from the separation restricting roller 12. The feeding roller holder 17 is further coupled to the frame of the body of the ADF 51 via the driving shaft 15a. On the side of the body of the ADF 51, a paper feeding unit case 18 is provided. The paper feeding unit case 18 is rotatably attached to the body of the ADF 51 via a fulcrum 19 composed of a shaft provided on the body of the ADF 51 so as to expose the paper feeding unit when opened.

The driven roller 16 is biased by springs 20, and a certain tension is exerted to the separating belt 11 by the springs 20. Between the driving roller 15 and the driving shaft 15a, a one-way clutch 21 is provided, and the driving roller 15 rotates in the clockwise direction in FIG. 5 by the one-way clutch 21. Furthermore, the separation restricting roller 12 is made to rotate in the clockwise direction in FIG. 5, and thus, the topmost sheet is separated from the stack of sheets P fed between the separating belt 11 and the separation restricting roller 12.

The sheet separated by the separating belt 11 and the separation restricting roller 12 is reversed by a first conveying roller 23 on driving side and a driven roller 24 along a reverse path 25 and is conveyed towards the slit glass 152.

Figure 6:
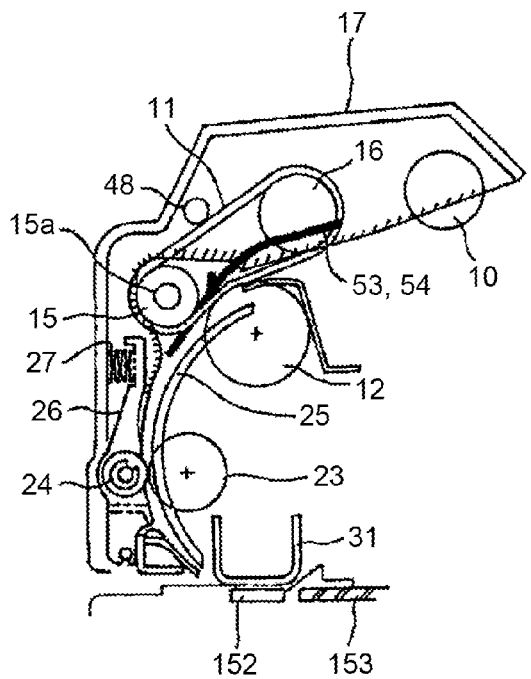
FIG. 6 is a diagram illustrating a configuration of a relevant portion of a feeding and separating system.
Figure 7:
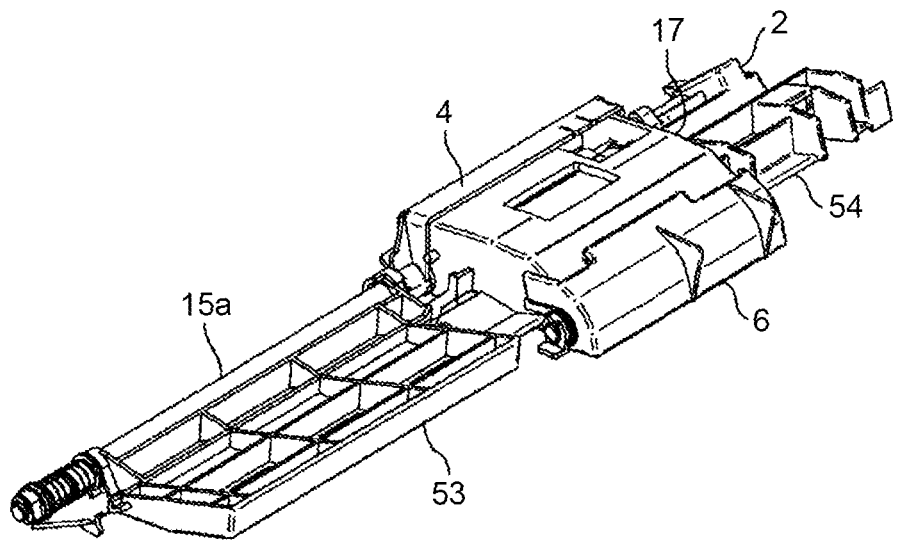
FIG. 7 is a top perspective view of guide plates, the feeding roller holder including a feeding roller, a separating belt, the driving shaft, and others.
Figure 8:
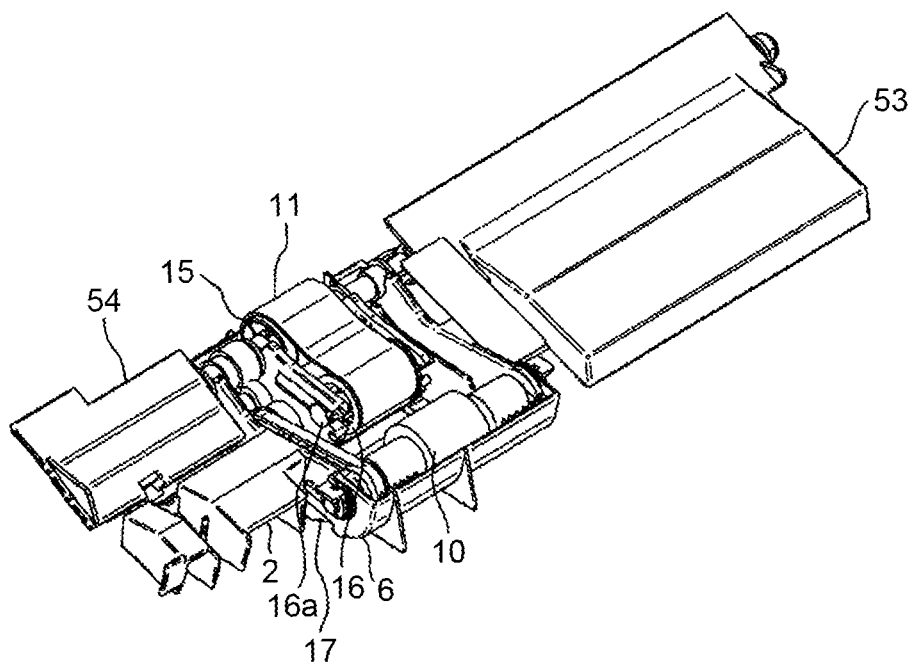
FIG. 8 is a bottom perspective view of the guide plates, the feeding roller holder including the feeding roller, the separating belt, the driving shaft, and others.
Figure 9:
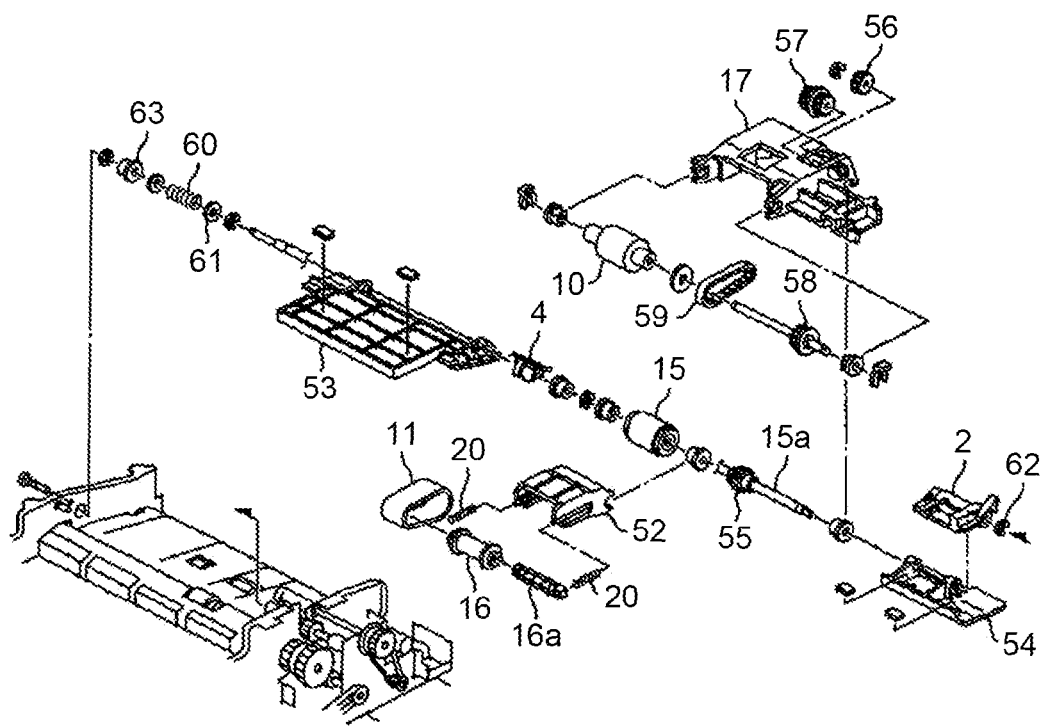
FIG. 9 is an exploded view of the guide plates, the feeding roller holder including the feeding roller, the separating belt, the driving shaft, and others.

FIG. 6 is a diagram illustrating the configuration of a relevant portion of a feeding and separating system. FIG. 7 is a perspective view of guide plates 53 and 54, the feeding roller holder 17 including the feeding roller 10, the separating belt 11, the driving shaft 15a, and others taken from top side of the feeding roller holder 17. FIG. 8 is a perspective view of the guide plates 53 and 54, the feeding roller holder 17 including the feeding roller 10, the separating belt 11, the driving shaft 15a, and others taken from the underside of the feeding roller holder 17. FIG. 9 is an exploded view of the guide plates 53 and 54, the feeding roller holder 17 including the feeding roller 10, the separating belt 11, the driving shaft 15a, and others.

The guide plates 53 and 54 are provided between the feeding roller 10 and the reverse path 25, and the guide plates 53 and 54 are rotatably attached to the driving shaft 15a. The guide plates 53 and 54 extend for a given length in the document conveying direction constituting a conveying path that makes sliding contact with the stack of sheets fed by the feeding roller 10 in the width direction and guides the document towards the reverse path 25. The guide plates 53 and 54 are in sliding contact with the sheet at both ends in the width direction prevents uplift of the ends of the sheet in the width direction.

The driven roller 24 is attached to a lever 26, which is attached to be rotatable centering around the fulcrum 19, and is pressed towards the first conveying roller 23 by a spring 27 that pushes the lever 26.

The first conveying roller 23 and the driven roller 24 clamp the sheet separated and convey the sheet to the slit glass 152 passing through a reverse guide 28, and then to a discharging path 30 to be scooped up by a reverse discharging guide 29. Furthermore, a reflective guide plate 31 is provided over the slit glass 152, and the reflective guide plate 31 constitutes a reference white when reading.

The sheet conveyed to the discharging path 30 is clamped and conveyed by a second conveying roller 32 on driving side and a driven roller 33, is then clamped and discharged to the outside by a discharging roller 34 on driving side and a driven roller 35 through the discharging path 30, and after being neutralized by a neutralization brush 36, is discharged on an exterior cover 37.

Meanwhile, the reflector 7 that covers over the exposure glass 153 is provided on the undersurface of a pressing plate 38. The pressing plate 38 presses the document placed on the exposure glass 153 towards the exposure glass 153.

The pressing plate 38 is rotatably attached to a main frame 40 via a fulcrum 39. The main frame 40 is attached to the shaft of the driven roller 35 at the end portion thereof and is secured to the body of the ADF 51.

The main frame 40 has an area to cover the exposure glass 153 and is attached with the exterior cover 37 on the upper surface thereof, constituting a document discharging table with the exterior cover 37. The pressing plate 38 is further coupled to an auxiliary frame 42 via links 41 (only one of the links 41 is depicted in FIG. 5). The auxiliary frame 42 is formed to clamp the outer circumferential portion of the main frame 40 and is rotatably coupled to the main frame 40 via fulcrums 43.

The main frame 40 is further provided with a magnet 44, and the magnet 44 attracts the auxiliary frame 42. The auxiliary frame 42 may be generally constructed of metal, or may be generally formed by an elastic member such as plastic and a portion attracted by the magnet 44 may be formed of metal. The attracting means is not restricted to a magnet, and any member will do as long as it attracts the auxiliary frame 42 to the main frame 40.

At the tip (left-end portion in FIG. 5) of the auxiliary frame 42, a guide plate 42a constituting a part of the discharging path 30 is provided, and on the guide plate 42a, the driven roller 33 is rotatably provided.

At a portion of the auxiliary frame 42 near the guide plate 42a, a handle 46 is provided. The handle 46 can be grasped by a user. The main frame 40 further includes a stopper 47. The stopper 47 contacts a base-end portion of the auxiliary frame 42 (right-end portion in FIG. 5) to restrict the auxiliary frame 42 to rotate by more than a given amount in the counter-clockwise direction centering around a fulcrum 43. In FIG. 5, the reference numeral 48 represents a driven roller that is in sliding contact with the separating belt 11.

As illustrated in FIGS. 7 to 9, the guide plates 53 and 54 are rotatably attached to the driving shaft 15a, and are made to be attached and detached with respect to the driving shaft 15a by taking the driving shaft 15a out from shaft holes formed thereon at given positions or putting the driving shaft 15a through the shaft holes.

Figure 10:
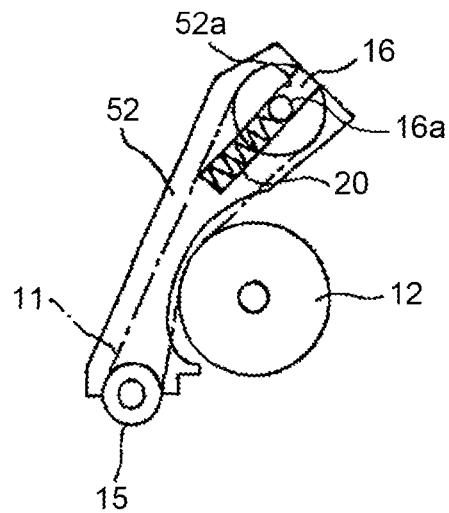
FIG. 10 is a side view of a belt holder.

The driving roller 15 is attached to the driving shaft 15a via the one-way clutch 21, and on both end portions of the driving roller 15, a pair of belt holders 52 is provided. Each of the belt holders 52 has, as illustrated in FIG. 10, a cutout portion 52a extending from a central portion in a direction to move away from the driving roller 15. On the cutout portion 52a, the springs (biasing members) 20 are attached.

Inside the cutout portion 52a, a shaft portion 16a of the driven roller 16 is housed. The driven roller 16 is made to slide within the cutout portion 52a to be close to or away from the driving roller 15. The springs 20 bias the driven roller 16 in the direction to move away from the driving roller 15. Biasing the driven roller 16 in this way exerts tension on the separating belt 11.

Furthermore, moving the driven roller 16 closer towards the driving roller 15 side resisting the biasing force of the springs 20 releases the tension exerted to the separating belt 11, enabling the separating belt 11 to be detached or attached with respect to the driving shaft 15a. When the separating belt 11 is removed from the driving shaft, the driven roller 16 comes out from the cutout portion 52a. In the present embodiment, the separating belt 11, the driving roller 15, the driven roller 16, and the springs 20 constitute a separating rotating body.

Figure 11:
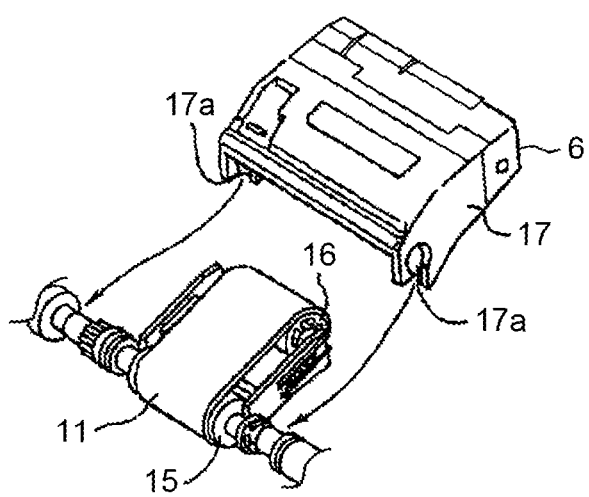
FIG. 11 is a perspective view illustrating a condition of the feeding roller holder removed from the driving shaft.
Figure 12:
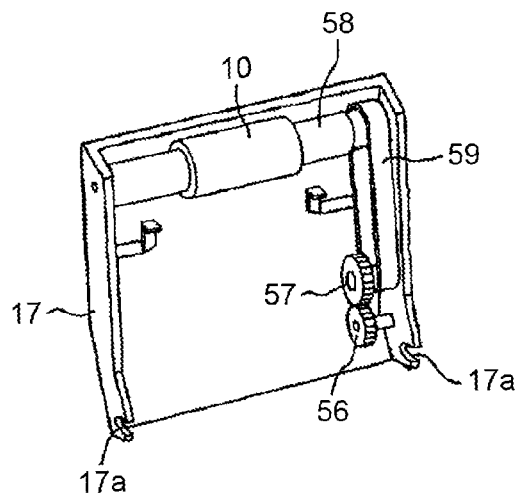
FIG. 12 is a perspective view illustrating a configuration of the feeding roller and driving force transmitting members.

The feeding roller 10 is rotatably supported by the feeding roller holder 17, and is covered with a feeding roller cover 6 provided on the feeding roller holder 17. The feeding roller holder 17 is, as illustrated in FIGS. 11 and 12, made to be attached and detached with respect to the driving shaft 15a by engaging and disengaging cutout portions 17a formed at given positions thereof with respect to the driving shaft 15a.

Furthermore, on the driving shaft 15a, a driving gear 55 is secured, and the driving gear receives driving force transmitted from a feed motor not depicted. The driving gear 55 is meshed with a belt gear 57 via an idler gear 56 rotatably attached to the feeding roller holder 17, and the belt gear 57 is coupled to a belt gear 58 via a belt 59. The belt gears 57 and 58 are rotatably provided on the feeding roller holder 17. The rotation of the driving gear 55, more specifically, the rotation of the driving shaft 15a, is transmitted to the feeding roller 10 via the idler gear 56 and the belt 59. In the present embodiment, the idler gear 56, the belt gears 57 and 58, and the belt 59 constitute a driving force transmitting member.

On one end portion of the driving shaft 15a, a spring 60 is provided. One end of the spring 60 is in contact with a tubular member 63 provided on one end portion of the driving shaft 15a to be slidable, and the other end thereof is in contact with a ring 61 held in engagement on the end portion side of the driving shaft 15a. On the other end portion of the driving shaft 15a, an engaging member 62 is provided. The engaging member 62 is made to engage with an engagement groove formed on a body frame of the ADF 51.

The one end portion of the driving shaft 15a is also made to engage with an engagement groove formed on the body frame of the ADF 51. After the tubular member 63 is made to engage with the engagement groove on the frame and the tubular member 63 is moved along the driving shaft 15a towards the other end portion side of the driving shaft 15a resisting the biasing force of the spring 60, engaging the engaging member 62 with the engagement groove of the frame causes the tubular member 63 to be biased by the spring 60 towards the one end portion side of the driving shaft 15a and to be supported by the frame.

After the engaging member 62 is removed from the engagement groove of the frame, removing the ring 61 side of the driving shaft 15a from the engagement groove causes the biasing force by the spring 60 to be released allowing the driving shaft 15a to be removed from the frame. More specifically, the driving shaft 15a in the present embodiment can be attached and detached with respect to the body of the ADF 51.

When the stack of sheets P is placed on the document table 9 with the document side facing up and a start switch is pressed, the stack of sheets P is pressed to the feeding roller 10 by the pressing plate 14, whereby the topmost sheet is conveyed towards the separating belt 11 by the feeding roller 10.

In this case, because the driving force from the feed motor is transmitted to the feeding roller 10 via the driving gear 55, the idler gear 56, and the belt 59, the feeding roller 10 and the driving roller 15 are rotated.

The stack of sheets P, after the topmost sheet of which is separated by the separating belt 11 and the separation restricting roller 12, is conveyed by the first conveying roller 23 and the driven roller 24 along the reverse path 25 over the slit glass 152, and then the sheet side is read by the exposure lamp 154, the mirror 155, and such at the slit glass 152. The document (sheet) finished to be read is conveyed through the discharging path 30 by the second conveying roller 32 and the driven roller 33, and then discharged onto the exterior cover 37 by the discharging roller 34 and the driven roller 35.

In contrast, when performing replacement or maintenance on the feeding roller 10, the separating belt 11, and the guide plates 53 and 54 constituting a part of the separating and feeding system, after the paper feeding unit case 18 is opened, the driving shaft 15a is removed from the body frame of the ADF 51. In this case, because the feeding roller 10, the separating belt 11, and the guide plates 53 and 54 are integrated as a unit being attached to the driving shaft 15a in an integrated manner, the foregoing are integrally removed together with the driving shaft 15a.

When performing the replacement or maintenance on the guide plates 53 and 54, the guide plates 53 and 54 are drawn out from the driving shaft 15a to remove them.

When performing the replacement or maintenance on the feeding roller 10, because the cutout portions 17a are engaged with the driving shaft 15a, the feeding roller holder 17 is easily removed from the driving shaft 15a by pulling the feeding roller holder 17 in a given direction as illustrated in FIG. 11.

Figure 13:
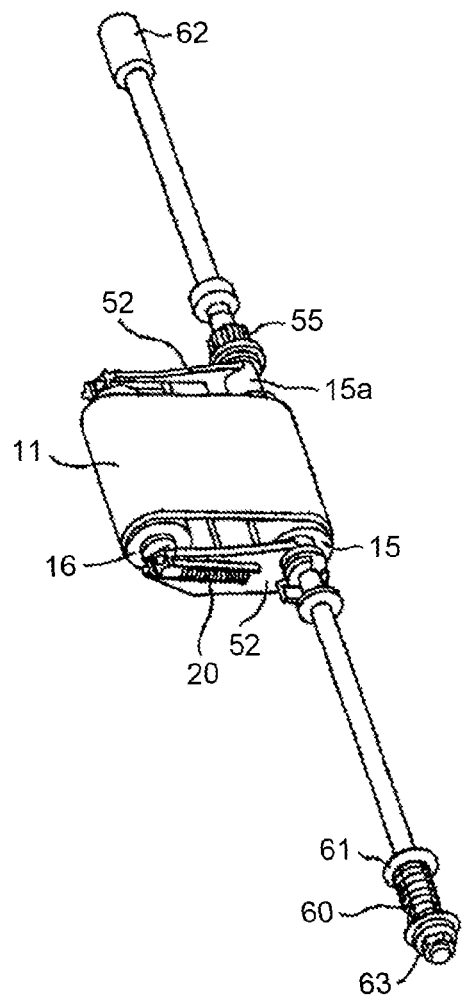
FIG. 13 is a perspective view illustrating a condition of a separating rotating body attached to the driving shaft.

When performing the replacement or maintenance on the separating belt 11, in a condition of the feeding roller holder 17 and the guide plates 53 and 54 being removed from the driving shaft 15a as illustrated in FIG. 13, moving the driven roller 16 closer towards the driving roller 15 side within the cutout portion 52a resisting the biasing force of the springs 20 releases the tension on the separating belt 11. Under this condition, moving the separating belt 11 along the driving shaft 15a removes the separating belt 11 from the driving shaft 15a.

When the replacement or maintenance of the foregoing members is finished, the driving shaft 15a is inserted into the separating belt 11 and the separating belt 11 is moved towards the driving roller 15 side along the driving shaft 15a. The driven roller 16 is then moved closer towards the driving roller 15 side within the cutout portion 52a resisting the biasing force of the springs 20. Thereafter, the driven roller 16 is moved away from the driving roller 15 within the cutout portion 52a by the biasing force of the springs 20 to exert a tension on the separating belt 11, thereby attaching the separating belt 11.

When attaching the feeding roller 10, the cutout portions 17a are engaged with the driving shaft 15a to make the driving gear 55 mesh with the idler gear 56. When attaching the guide plates 53 and 54, the guide plates 53 and 54 are attached by inserting the driving shaft 15a to the shaft holes. In this case, because the feeding roller 10, the separating belt 11, and the guide plates 53 and 54 are integrated as a unit together with the driving shaft 15a, making the driving shaft 15a engage with the engagement grooves of the body frame of the ADF 51 attaches the foregoing unit to the frame.

As in the present embodiment in the foregoing, the separating belt 11 and the guide plates 53 and 54 are attached to the driving shaft 15a and the feeding roller 10 is attached to the driving shaft 15a via the driving force transmitting member composed of the driving gear 55, the idler gear 56, the belt gears 57 and 58, and the belt 59, and the driving shaft 15a is attached and detached with respect to the body of the ADF 51. This allows the guide plates 53 and 54, the feeding roller 10, and the separating belt 11 to be integrated as a unit together with the driving shaft 15a, whereby the attaching and detaching work of the guide plates 53 and 54, the feeding roller 10, and the separating belt 11 can be easily performed. As a consequence, the workability in replacement and maintenance work of the forgoing members can be substantially improved.

Furthermore, the feeding roller 10 is held by the feeding roller holder 17 together with the driving force transmitting member, and the feeding roller holder 17 is attached and detached with respect to the driving shaft 15a. This allows the feeding roller 10 together with the driving force transmitting member to be attached and detached with respect to the driving shaft 15a when the integrated guide plates 53 and 54, feeding roller 10, and separating belt 11 are removed from the body of the ADF 51. Consequently, the workability in replacement and maintenance work of the feeding roller 10 can be substantially improved.

Moreover, moving the driven roller 16 closer towards the driving roller 15 side resisting the biasing force of the springs 20 or away from the driving roller 15 side releases or exerts the tension on the separating belt 11 to allow attaching and detaching of the separating belt 11 with respect to the driving shaft 15a. Accordingly, when the integrated guide plates 53 and 54, feeding roller 10, and separating belt 11 are removed from the body of the ADF 51, the separating belt 11 can be attached and detached with respect to the driving shaft 15a. Consequently, the workability in replacement and maintenance work of the separating belt 11 can be substantially improved.

In the present embodiment, the guide plates 53 and 54 are exemplified to be attached and detached with respect to the driving shaft 15a. However, the guide plates 53 and 54 may be configured to be supported by a supporting means different from the driving shaft 15a. In this case, at least the feeding roller holder 17 including the feeding roller 10 and the separating belt 11 having the above-described structure only need to be attached and detached with respect to the driving shaft 15a. This arrangement can yield that the feeding roller 10, the driving force transmitting member, or the separating belt 11 can be attached and detached independently with respect to the driving shaft 15a when the integrated feeding roller 10 and separating belt 11 are removed from the body of the ADF 51. Accordingly, the workability in replacement and maintenance work of the feeding roller 10 or the separating belt 11 can be substantially improved.

Next, the features of the present invention will be described.

Because a lifting member 2 is rotatably supported by the driving shaft 15a when the lifting member 2 is assembled to the driving shaft 15a, there may be a situation of the lifting member 2 being wrongly assembled at a position different from a normal position. When the driving shaft 15a is attached to the device body while the lifting member 2 is in a position different from the normal position, the lifting member 2 may be damaged or a failure in document feeding by the feeding roller 10 may result as the feeding roller holder 17 cannot be raised or lowered properly.

Figure 1:
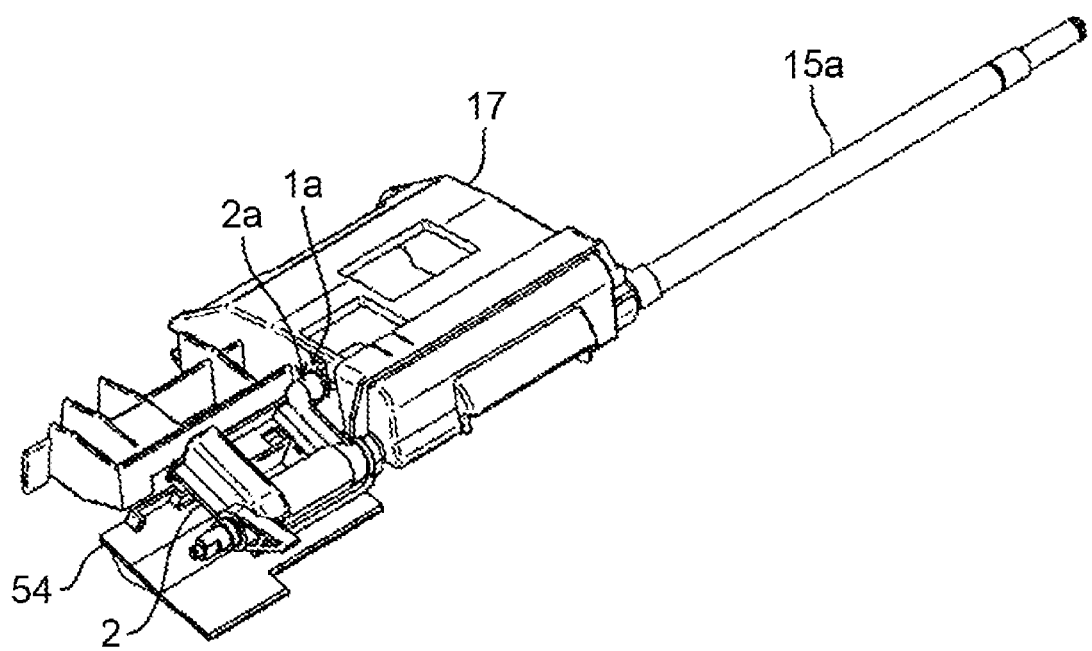
FIG. 1 is a perspective view illustrating a completed condition of attaching a feeding roller holder and a lifting member to a driving shaft.
Figure 14:
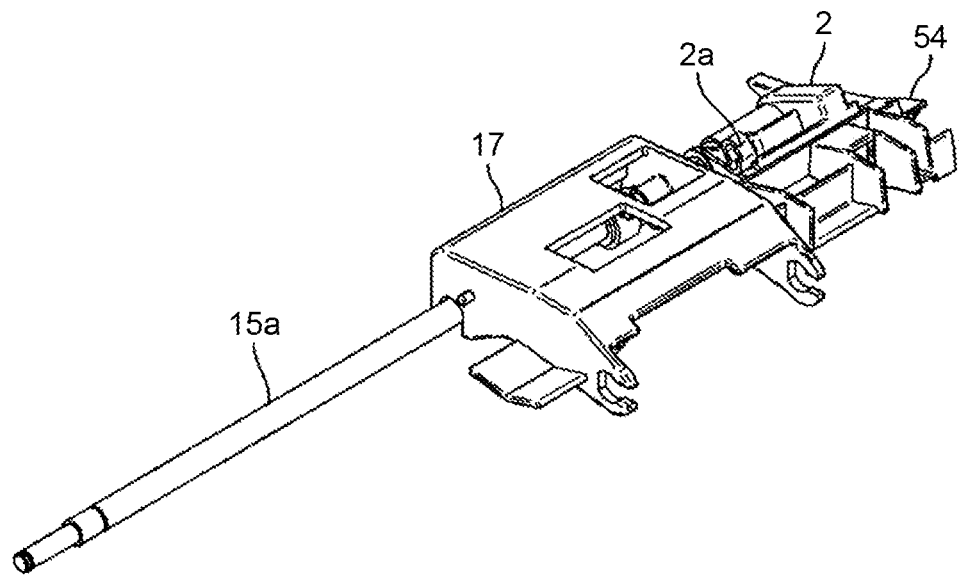
FIG. 14 is a perspective view illustrating a condition of the driving shaft halfway attached with the feeding roller and the lifting member.
Figure 15:
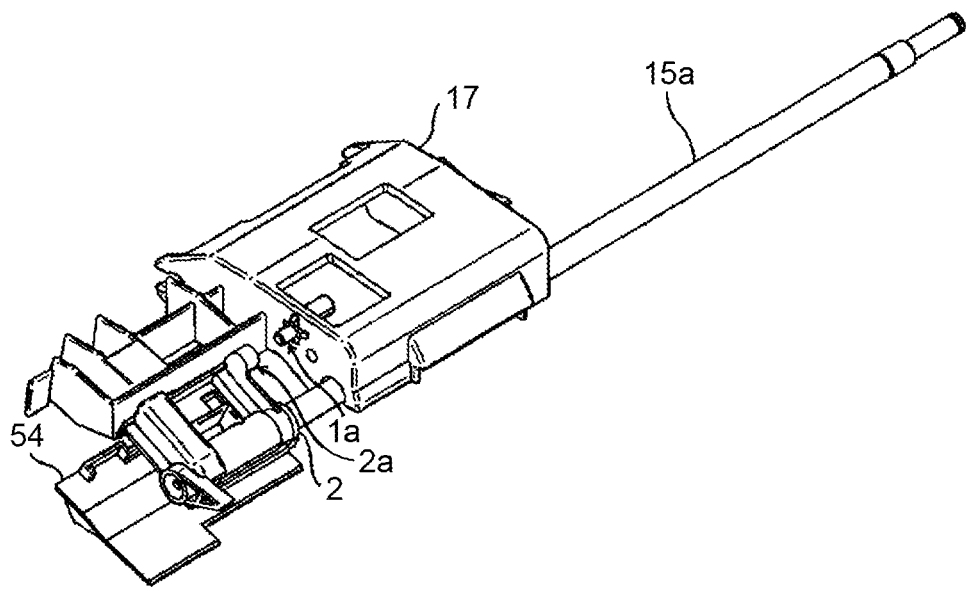
FIG. 15 is a perspective view illustrating a condition of the driving shaft halfway attached with the feeding roller and the lifting member.

In the present embodiment, as illustrated in FIGS. 14 and 15, the feeding roller holder 17 has a projecting portion 1a that is a fitted portion in a projecting form on the side surface thereof, and the lifting member 2 has a fitting portion 2a in an elongated-hole shape that fits the projecting portion 1a. The projecting portion 1a may be provided on the lifting member 2, and the fitting portion 2a may be provided on the feeding roller holder 17. When assembling the feeding roller holder 17 and the lifting member 2 to the driving shaft 15a, the projecting portion 1a and the fitting portion 2a are made to fit as illustrated in FIG. 1. This restricts the rotational range of the lifting member 2 centering around the driving shaft 15a with respect to the feeding roller holder 17. Accordingly, the lifting member 2 is assembled to the driving shaft 15a in a normal position with reference to the position of the feeding roller holder 17 such that the lifting member 2 assumes the normal position in which the feeding roller holder 17 is raised and lowered, preventing the lifting member 2 from being assembled wrongly to the driving shaft 15a. As a consequence, it can be prevented that the lifting member 2 is damaged or a failure in document feeding by the feeding roller 10 is caused as the driving shaft 15a is attached to the device body while the position of the lifting member 2 is different from the normal position.

The feeding roller holder 17 and the lifting member 2 are assembled to the driving shaft 15a by fitting the projecting portion 1a and the fitting portion 2a so as to allow the feeding roller holder 17 to be raised and lowered in connection with the rotation of the lifting member 2. More specifically, rotating the lifting member 2 upward centering around the driving shaft 15a by an eccentric cam not depicted makes the projecting portion 1a contact an upper portion of an inner wall surface of the fitting portion 2a, and thus allows the feeding roller holder 17 to be raised centering around the driving shaft 15a coordinating with the rotation of the lifting member 2. On the other hand, rotating the lifting member 2 downward centering around the driving shaft 15a by the eccentric cam makes the projecting portion 1a contact a lower portion of the inner wall surface of the fitting portion 2a, and thus allows the feeding roller holder 17 to be lowered centering around the driving shaft 15a coordinating with the rotation of the lifting member 2.

In the present embodiment as in the foregoing, the projecting portion 1a and the fitting portion 2a serve both as a mechanism that prevents the lifting member 2 from being wrongly assembled to the driving shaft 15a and as a mechanism that raises and lowers the feeding roller holder 17 by the lifting member 2. This allows simplifying the configuration of the device, thereby achieving downsizing of the device and reduction in cost.

Figure 16:
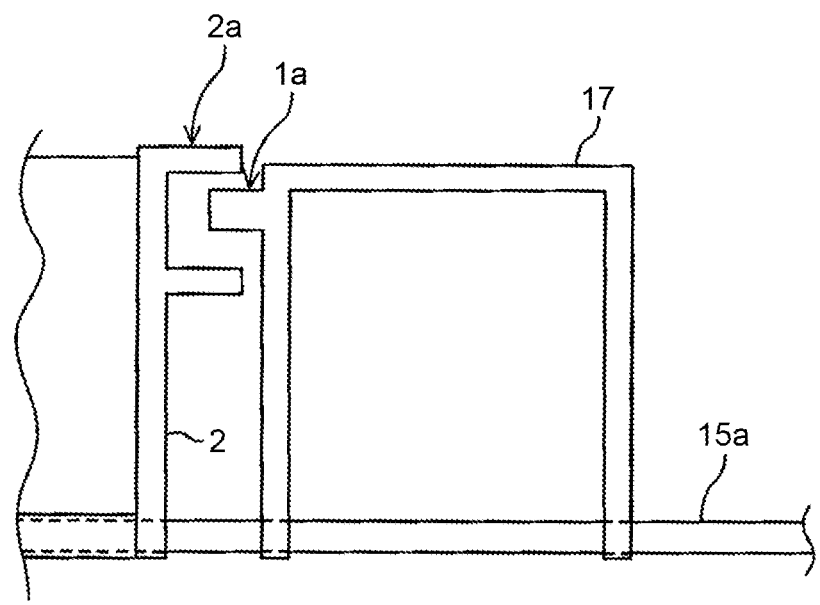
FIG. 16 is a schematic diagram illustrating a relationship between a fitting portion and a projecting portion in a condition of the lifting member and the feeding roller holder attached to the driving shaft.
Figure 17:
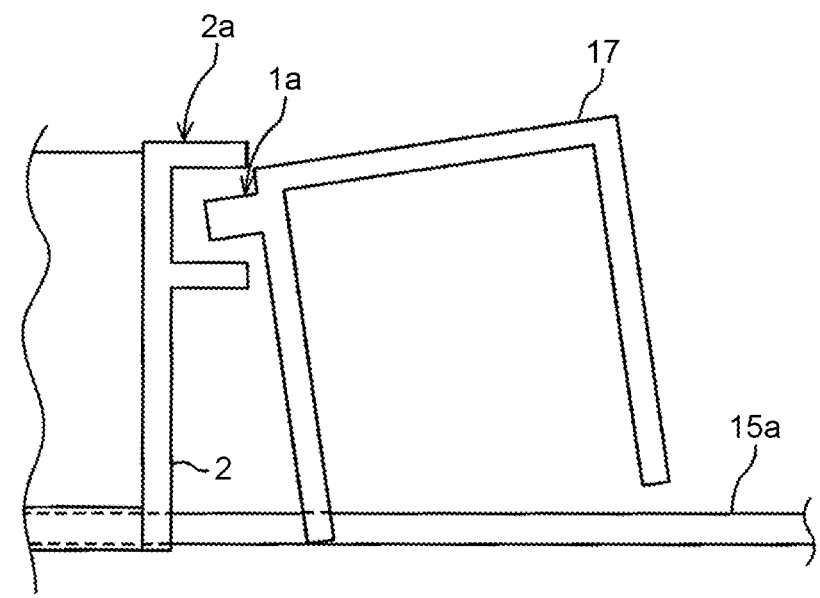
FIG. 17 is a schematic diagram illustrating a relationship between the fitting portion and the projecting portion in a condition of the feeding roller holder inclined when attaching and detaching the feeding roller holder to and from the driving shaft.

Furthermore, the fitting portion 2a provided on the lifting member 2 is made in an elongated-hole shape. This forms, within the fitting portion 2a as illustrated in FIG. 16, space that allows the projecting portion 1a to move in the longer direction of the elongated hole. Accordingly, when attaching or detaching the feeding roller holder 17 with respect to the driving shaft 15a, even when the feeding roller holder 17 is inclined with respect to the lifting member 2 as illustrated in FIG. 17, the projecting portion 1a moves in the longer direction within the fitting portion 2a and the feeding roller holder 17 can be attached or detached easily without causing the projecting portion 1a and the fitting portion 2a to interfere with each other.

Specifically, even while the guide plate 53 is assembled to the driving shaft 15a, the feeding roller holder 17 can be attached or detached with respect to the driving shaft 15a by inclining the feeding roller holder 17 such that the feeding roller holder 17 and the guide plate 53 do not interfere with each other. Accordingly, when performing replacement work and maintenance work on the feeding roller 10 and the separating belt 11, the operation to remove the guide plate 53 from the driving shaft 15a can be omitted. This allows the workability in the replacement work or maintenance work to be improved for that extent.

When the driving shaft 15a is attached to the device body after the various members removed from the driving shaft 15a are attached back to the driving shaft 15a at the end of replacement work or maintenance work, there may be a situation in which the guide plate 53 rotatably supported on the driving shaft 15a assumes a position different from a normal position being inverted and such. In this case, when the driving shaft 15*a* is attached to the device body while the guide plate 53 is in a position different from the normal position, the guide plate 53 may be damaged or poor conveyance may result.

Figure 18:
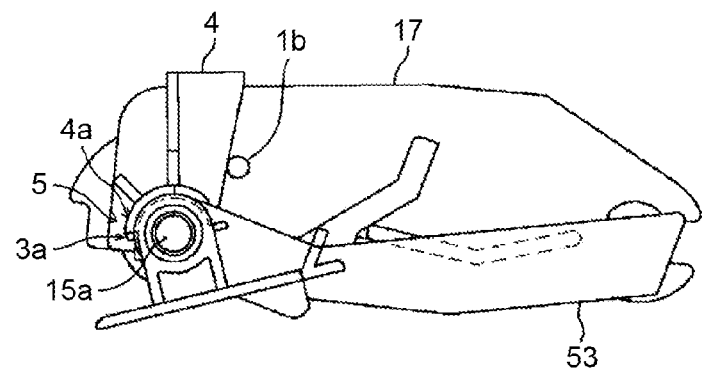
FIG. 18 is a diagram illustrating a condition of the guide plate in a normal position with reference to the position of the feeding roller holder.

In the present embodiment, as illustrated in FIG. 18, a rotation restricting unit 5 that restricts the movable range of the guide plate 53 is provided. The rotation restricting unit 5 is composed of a projecting portion 3*a* provided on the guide plate 53 and an interfering portion 4*a* provided on an axis-direction movement restricting member 4 such that the projecting portion 3*a* is positioned within a given range of the rotational path of the projecting portion 3*a* passable when the guide plate 53 is rotated with respect to the driving shaft 15*a*. When the guide plate 53 is not properly assembled to assume a normal position with respect to the driving shaft 15*a*, the projecting portion 3*a* of the guide plate 53 and the interfering portion 4*a* of the axis-direction movement restricting member 4 interfere with each other in the rotation restricting unit 5, and thus the axis-direction movement restricting member 4 cannot be attached properly. Accordingly, being unable to attach the axis-direction movement restricting member 4 properly enables a worker to notice that the guide plate 53 is in a position different from the normal position, whereby wrong assembly can be prevented. As a consequence, it can be prevented that the guide plate 53 is damaged or poor conveyance is caused as the driving shaft 15*a* is attached to the device body while the guide plate 53 is in a position different from the normal position.

Figure 19:
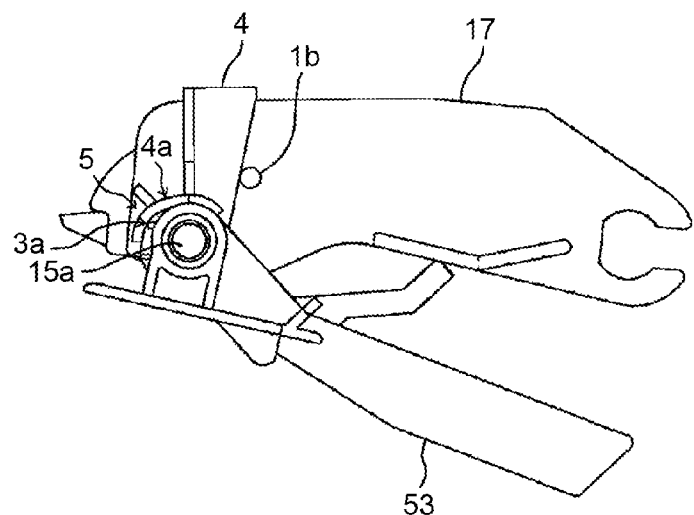
FIG. 19 is a diagram illustrating a condition of an axis-direction movement restricting member attached being deformed as the axis-direction movement restricting member is overriding a projecting portion provided on the guide plate.

As illustrated in FIG. 19, even when the guide plate 53 is in a position different from the normal position, the axis-direction movement restricting member 4 may be attached to the feeding roller holder 17 depending on the hardness of the axis-direction movement restricting member 4. The axis-direction movement restricting member 4 is deformed as the interfering portion 4*a* provided on the axis-direction movement restricting member 4 is overriding the projecting portion 3*a* provided on the guide plate 53.

Figure 20:
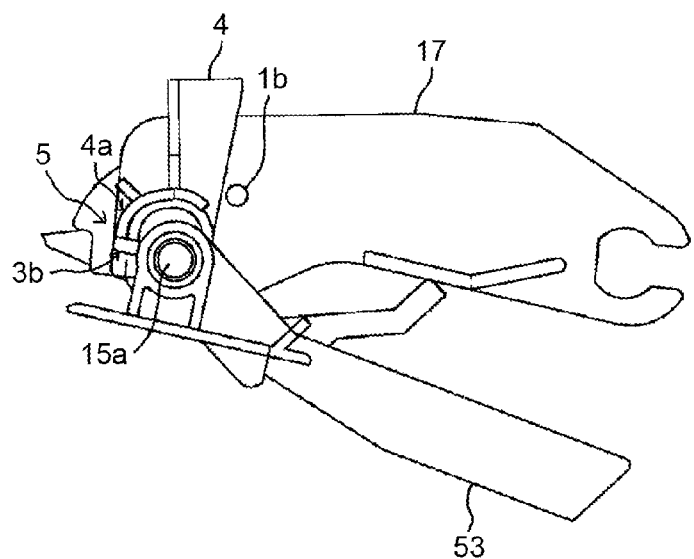
FIG. 20 is a diagram illustrating a condition of the guide plate provided with a projecting portion having a size of the extent not to be overridden even when the axis-direction movement restricting member is deformed.

For this reason, as illustrated in FIG. 20, a projecting portion 3*b* is provided having a size of the extent not to be overridden by the interfering portion 4*a* even when the axis-direction movement restricting member 4 is deformed. Accordingly, when the guide plate 53 is in a position different from the normal position, the projecting portion 3*b* of the guide plate 53 and the interfering portion 4*a* of the axis-direction movement restricting member 4 interfere with each other. Therefore, the axis-direction movement restricting member 4 is in an uplifted condition with respect to the feeding roller holder 17, not allowing the axis-direction movement restricting member 4 to be attached properly. Consequently, being unable to attach the axis-direction movement restricting member 4 properly to the feeding roller holder 17 enables the worker to notice that the guide plate 53 is in a position different from the normal position, whereby wrong assembly can be prevented.

When the axis-direction movement restricting member 4 has excellent flexibility, even in a condition that the guide plate 53 is in a position different from the normal position and the projecting portion 3*a* of the guide plate 53 and the interfering portion 4*a* of the axis-direction movement restricting member 4 interfere with each other, the axis-direction movement restricting member 4 may be attached to the feeding roller holder 17 as the axis-direction movement restricting member 4 is twisted to move in a surface direction of the side surface of the feeding roller holder 17.

Figure 21:
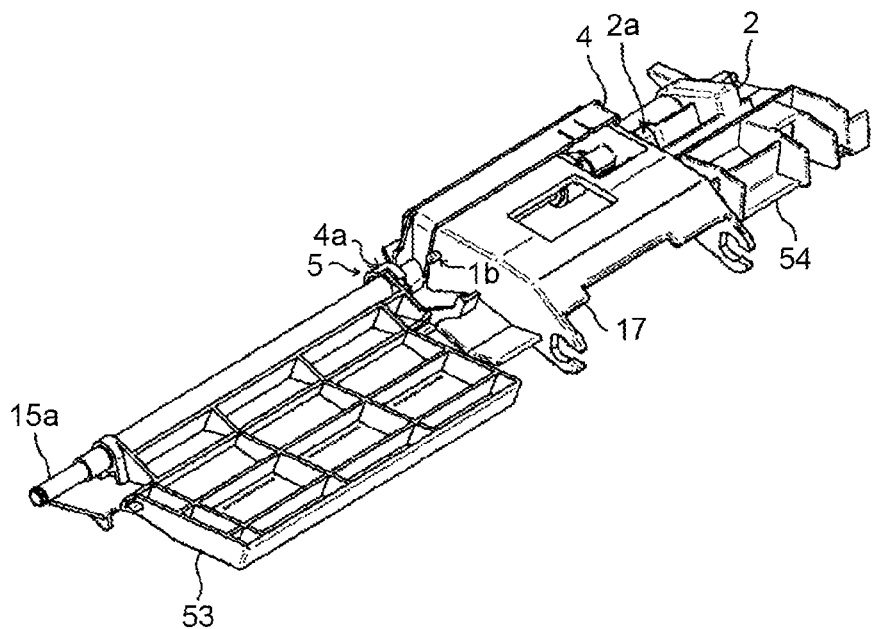
FIG. 21 is a perspective view illustrating a condition of twisting of an axis-direction movement restricting member restricted by a projecting portion provided to project from the side surface of the feeding roller holder, viewed from diagonally above the feeding roller holder.
Figure 22:
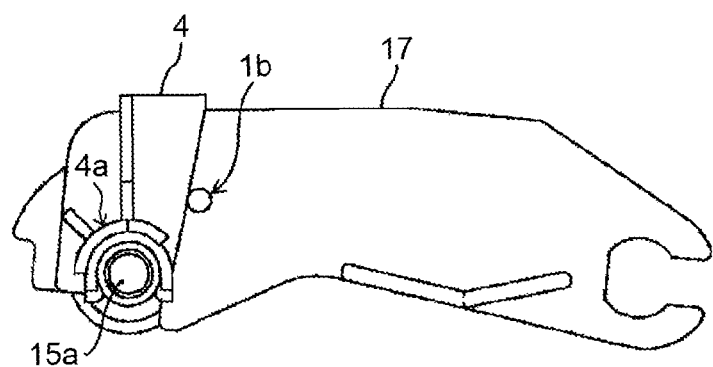
FIG. 22 is a side view illustrating the condition of the twisting of the axis-direction movement restricting member restricted by the projecting portion provided to project from the side surface of the feeding roller holder, viewed from the side of the feeding roller holder.
Figure 23:
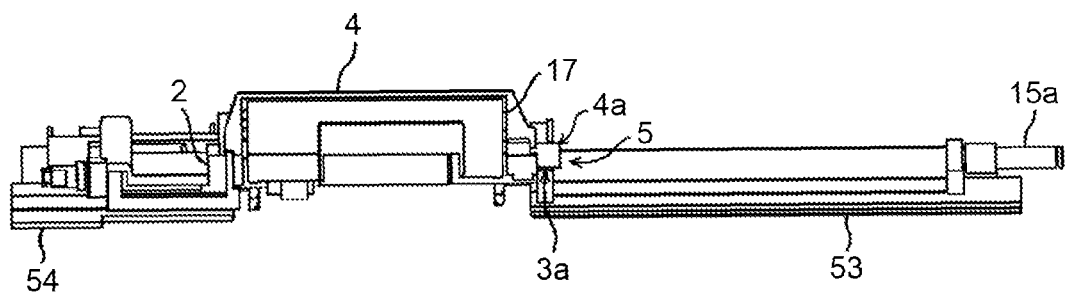
FIG. 23 is a rear view illustrating the condition of the twisting of the axis-direction movement restricting member restricted by the projecting portion provided to project from the side surface of the feeding roller holder, viewed from the rear of the feeding roller holder.

Therefore, as illustrated in FIGS. 21 and 22, a projecting portion 1*b* provided to project from the side surface of the feeding roller holder 17 and the axis-direction movement restricting member 4 are made to contact with each other in the surface direction of the side surface such that the axis-direction movement restricting member 4 is unable to move in the surface direction to restrict the twisting of the axis-direction movement restricting member 4. Accordingly, the axis-direction movement restricting member 4 can be prevented from being attached to the feeding roller holder 17 being twisted in a condition that the guide plate 53 is in a position different from the normal position and the projecting portion 3*a* of the guide plate 53 and the interfering portion 4*a* of the axis-direction movement restricting member 4 are interfering with each other. As a consequence, as illustrated in FIG. 23, the axis-direction movement restricting member 4 can be attached to the feeding roller holder 17 without being twisted, whereby the movement of the feeding roller holder 17 in the axis direction of the driving shaft can be restricted appropriately, and the guide plate 53 can be assembled to the device body in the normal position.

The above-described explanation is merely an example, and the present invention has specific effects for each of the following aspects.

Aspect A

A document conveying device includes a document table on which a stack of sheets composed of a plurality of documents is placed, a rotating shaft member detachably provided on a device body to be rotated by rotary driving force transmitted from a driving source, a feeding member attached to the rotating shaft member via a driving force transmitting member to contact and feed the topmost document of the stack of sheets placed on the document table, a separating unit attached to the rotating shaft member to separate the topmost sheet of the stack of sheets one by one from the stack of sheets fed by the feeding member, a plurality of rotating members rotatably attached to the rotating shaft member, a holding member that is one of the rotating members and is detachable from the rotating shaft member to hold the feeding member and a driving force transmitting member, and a rotating member position restricting unit that restricts a position of the other rotating members to a given predetermined position with reference to a position of the holding member. Accordingly, as described in the embodiment above, the rotating members rotatably attached to the rotating shaft member can be prevented from being wrongly assembled to the device body.

Aspect B

In the aspect A, the rotating members may include a lifting member that raises and lowers the holding member to make the feeding member contact with and separate from the document in connection with rotation of the lifting member, and the rotating member position restricting unit may include a lifting member position restricting unit that restricts the position of the lifting member with reference to the position of the holding member so that the lifting member assumes a normal position in which the lifting member can raise and lower the holding member. This allows, as described in the embodiment above, the lifting member to be prevented from being assembled in a position different from the normal position.

Aspect C

In the aspect B, the lifting member position restricting unit may include a fitting portion provided on one of the lifting member and the holding member, and a fitted portion that is provided on the other of the lifting member and the holding member to be fitted in the fitting portion. This allows, as described in the embodiment above, the rotatable range of the lifting member to be restricted, whereby the lifting member can be prevented from being assembled in a position different from the normal position.

Aspect D

In the aspect C, the fitting portion may be in a shape of an elongated hole, and the fitted portion may have a projecting form. This allows, as described in the embodiment above, the holding member to be easily attached and detached with respect to the rotating shaft member.

Aspect E

In any one of the aspects A to D, the rotating members may include a guide member that guides conveyance of the document, and the rotating member position restricting unit may include a guide member position restricting unit that restricts the position of the guide member with reference to the position of the holding member so that the guide member assumes a normal position in which the guide member can guide the conveyance of the document. This allows, as described in the embodiment above, the guide member to be prevented from being assembled in a position different from the normal position.

Aspect F

In the aspect E, the rotating shaft member may include a movement restricting member that restricts movement of the holding member in an axis direction of the rotating shaft member, and the movement restricting member may include a guide member rotation restricting portion as the guide member position restricting unit that restricts a rotatable range of the guide member. This allows, as described in the embodiment above, the rotatable range of the guide member to be restricted by the guide member rotation restricting portion provided on the movement restricting member, whereby the guide member can be prevented from being assembled in a position different from the normal position.

Aspect G

In the aspect F, the movement restricting member may be longer in an axis direction of the rotary shaft member and may include a twisting restricting unit that restricts twisting of the movement restricting member. This allows, as described in the embodiment above, the movement restricting member to be prevented from being attached while being twisted.

Aspect H

An image reading device includes a document reading unit that reads an image of a document while exposing the document, and a document conveying unit that conveys a document placed on a document placing portion passing through a read position of the document reading unit so as to make the document reading unit read the image of the document while conveying the document towards a conveying destination. The document conveying unit is the document conveying device according to any one of the aspects A to G. With this configuration, a favorable image reading can be performed.

Aspect I

An image forming apparatus includes an image forming unit that forms an image on a recording material, and an image reading unit that reads an image of a document while conveying the document. The image forming unit forms at least an image read by the image reading unit on the recording material, and the image reading unit is the image reading device according to the aspect H. With this configuration, a favorable image forming can be performed.

As in the foregoing, there is advantage in that the occurrence of wrong assembly in which the rotating members rotatably attached to the rotating shaft member can be prevented from being wrongly assembled to the device body.

According to the embodiments, on the rotating shaft member removed from the device body to perform replacement work, maintenance work, and such, the positions of the other rotating members attached to the rotating shaft member are restricted to assume given predetermined positions by a rotating member position restricting unit. Accordingly, the rotating shaft member can be attached to the device body in a condition of the other rotating members being in the given predetermined positions. As a consequence, the occurrence of wrong assembly in which the other rotating members are assembled to the device body in positions different from the given positions can be prevented.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A document conveying device comprising:
   a document table on which a stack of sheets composed of a plurality of documents is placed;
   a rotating shaft member detachably provided on a main body of the document conveying device and rotated by rotary driving force transmitted from a driving source;
   a feeding member configured to contact and feed a topmost sheet of the stack of sheets placed on the document table, the feeding member being attached to the rotating shaft member via a driving force transmitting member;
   a separating unit configured to separate the topmost sheet from one or more sheets that are fed together with the topmost sheet, the separating unit being attached to the rotating shaft member;
   a plurality of rotating members rotatably attached to the rotating shaft member;
   a holding member configured to hold the feeding member and the driving force transmitting member, the holding member being one of the rotating members and detachably attached to the rotating shaft member; and
   a rotating member position restricting unit configured to restrict a position of the rotating members other than the holding member to a given predetermined position with reference to a position of the holding member.

2. The document conveying device according to claim 1, wherein
   the rotating members include a lifting member configured to raise and lower the holding member to make the feeding member contact with and separate from the topmost sheet in connection with rotation of the lifting member, and
   the rotating member position restricting unit includes a lifting member position restricting unit configured to restrict a position of the lifting member with reference to the position of the holding member so that the lifting member assumes a normal position in which the lifting member is capable of raising and lowering the holding member.

3. The document conveying device according to claim 2, wherein the lifting member position restricting unit includes a fitting portion that is provided on one of the lifting member and the holding member and a fitted portion that is provided on the other of the lifting member and the holding member to be fitted in the fitting portion.

4. The document conveying device according to claim 3, wherein
   the fitting portion is in a shape of an elongated hole, and the fitted portion has a projecting form.

5. The document conveying device according to claim 1, wherein
   the rotating members include a guide member configured to guide conveyance of the sheet, and the rotating member position restricting unit includes a guide member position restricting unit configured to restrict a position of the guide member with reference to the position of the holding member so that the guide member assumes a normal position in which the guide member is capable of guiding the conveyance of the sheet.

6. The document conveying device according to claim 5, further comprising a movement restricting member configured to restrict movement of the holding member in an axis direction of the rotating shaft member, the movement restricting member being provided to the rotating shaft member, wherein the guide member position restricting unit includes a guide member rotation restricting portion configured to restrict a rotatable range of the guide member, the guide member rotation restricting portion being provided to the movement restricting member.

7. The document conveying device according to claim 6, wherein the movement restricting member is longer in an axis direction of a driving shaft, and the holding member includes a twisting restricting unit configured to restrict twisting of the movement restricting member.

8. An image reading device comprising:

a document reading unit configured to read an image of a document while exposing the document; and the document conveying device according to claim 1, the document conveying device being configured to convey the document placed on the document table towards a conveying destination through a read position of the document reading unit, the document reading unit reading the image of the document at the read position.

9. An image forming apparatus comprising:

an image forming unit configured to form an image on a recording material; and the image reading device according to claim 8, wherein the image read by the image reading device is formed on the recording material by the image forming unit.

10. The document conveying device according to claim 1, wherein the plurality of rotating members and the holding member are mounted on the rotating shaft member.

11. The document conveying device according to claim 1, wherein the plurality of rotating members and the rotating member position restricting unit are in axial alignment.

* * * * *